(12) United States Patent
Tanizawa et al.

(10) Patent No.: US 9,197,608 B2
(45) Date of Patent: Nov. 24, 2015

(54) COMMUNICATION METHOD, APPLICATION DEVICE, PROGRAM, AND COMMUNICATION SYSTEM

(71) Applicant: Kabushiki Kaisha Toshiba, Minato-ku (JP)

(72) Inventors: Yoshimichi Tanizawa, Yokohama (JP); Shinichi Baba, Bristol (GB)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 25 days.

(21) Appl. No.: 13/972,143

(22) Filed: Aug. 21, 2013

(65) Prior Publication Data

US 2014/0089663 A1    Mar. 27, 2014

(30) Foreign Application Priority Data

Sep. 27, 2012  (JP) ................................. 2012-214087

(51) Int. Cl.
*H04L 29/06* (2006.01)

(52) U.S. Cl.
CPC ............ *H04L 63/0428* (2013.01); *H04L 63/06* (2013.01); *H04L 63/18* (2013.01)

(58) Field of Classification Search
CPC ...... H04L 63/0428; H04L 63/06; H04L 63/18
See application file for complete search history.

(56) References Cited

U.S. PATENT DOCUMENTS

2008/0262968 A1* 10/2008 Saxena et al. .................. 705/51

FOREIGN PATENT DOCUMENTS

| JP | 2008-154019 | 7/2008 |
|---|---|---|
| JP | 2011-44768 A | 3/2011 |
| WO | WO 2012/025988 A1 | 3/2012 |

OTHER PUBLICATIONS

U.S. Appl. No. 13/714,809, filed Dec. 14, 2012, Yoshimichi Tanizawa et al.

Christian Kollmitzer, Mario Pivk (Eds.). "Applied Quantum Cryptography", Lecture Notes in Physics 797, Chapter 8, 22 pages.

Mehrdad Dianati et al. "Architecture and protocols of the future European quantum key distribution network", Security and Communication Networks, 2008, 18 pages.

Office Action issued Aug. 19, 2014, in Japanese Patent Application No. 2012-214087 with English translation.

Yoshimichi Tanizawa, et al., "An Encryption Key Sharing Network Designed for Supporting Quantum Key Distribution Technologies" Institute of Electronics, Information and Communication Engineers 2012 Society Conference Collection 2, Japan, Institute of Electronics, Information and Communication Engineers, Aug. 28, 2012, p. 139 and cover pages.

Office Action issued Mar. 10, 2015 in Japanese Patent Application No. 2012-214087 (with English language translation).

* cited by examiner

*Primary Examiner* — Justin T Darrow
(74) *Attorney, Agent, or Firm* — Oblon, McClelland, Maier & Neustadt, L.L.P.

(57) ABSTRACT

According to one embodiment, a communication method including acquiring an application key from a key-sharing network, determining a key use of the application key, and performing encryption communication by using the application key according to the determined key use.

17 Claims, 3 Drawing Sheets

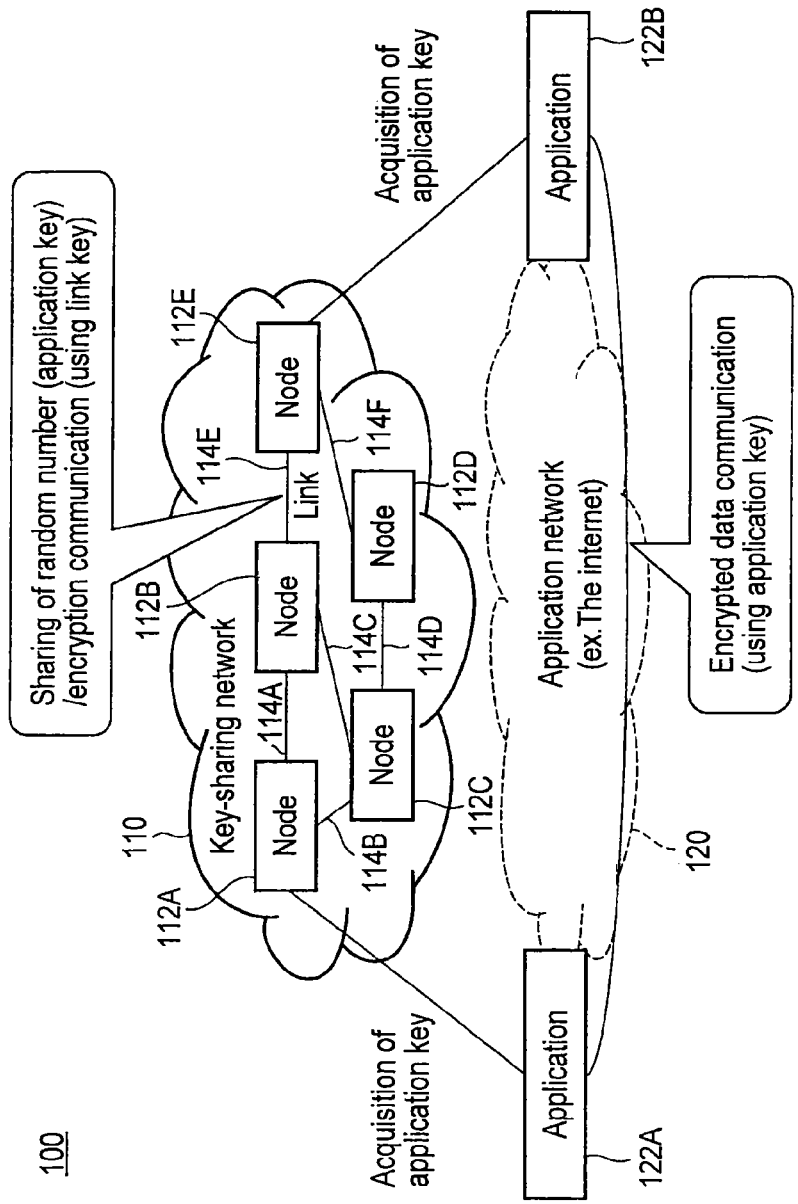
F I G. 1

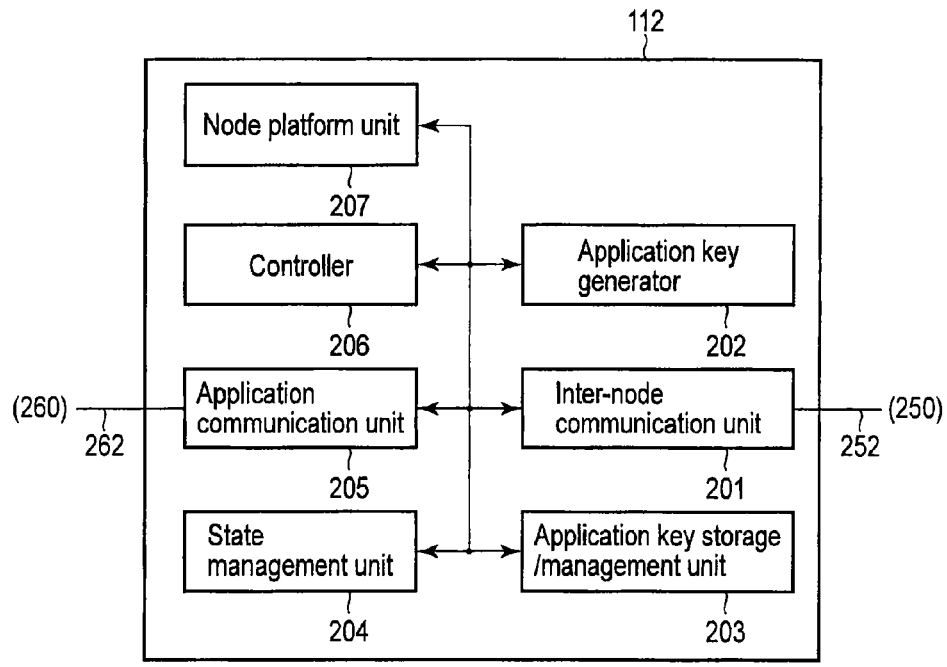
F I G. 2
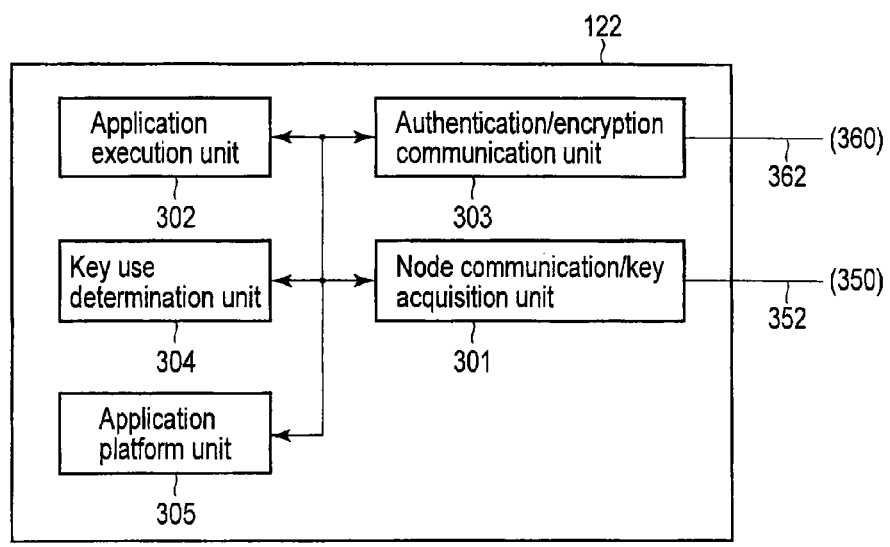
F I G. 3

COMMUNICATION METHOD, APPLICATION DEVICE, PROGRAM, AND COMMUNICATION SYSTEM

CROSS-REFERENCE TO RELATED APPLICATIONS

This application is based upon and claims the benefit of priority from Japanese Patent Application No. 2012-214087, filed Sep. 27, 2012, the entire contents of which are incorporated herein by reference.

FIELD

Embodiments described herein relate generally to a communication method, an application device, a program, and a communication system.

BACKGROUND

A key-sharing network is a network in which a plurality of nodes is connected to each other through a plurality of links. Each node has a function of generating and sharing a random number between itself and a correspondent node connected thereto through a link, and a function of performing encryption communication on the link by using the random number as an encryption key (hereinafter, referred to as "link key"). Some of these nodes have a function of generating an encryption key (hereinafter, referred to as "application key") which is a different random number from the link key, and a function of transmitting the application key to another node on a link.

An application in the key-sharing network has a function of acquiring an application key from the node and performing encrypted data communication with another application by using the application key. The encrypted data communication can be performed over a network (hereinafter, referred to as application network) different from the key-sharing network.

The application that acquires the application key from the node included in the key-sharing network needs to set a key use of the application key in advance. For example, information concerning a key length and a key ID which are used in an encryption algorithm (for example, Advanced Encryption Standard [AES], Data Encryption Standard [DES], and the like) and information concerning an ID which is used in an authentication algorithm need to be set in both communicating applications in advance. Such presetting is impractical in a network having a plurality of applications communicating each other.

BRIEF DESCRIPTION OF THE DRAWINGS

FIG. 1 is a view illustrating an encryption communication system according to an embodiment;

FIG. 2 is a block diagram illustrating a configuration of a node according to the embodiment;

FIG. 3 is a block diagram illustrating a configuration of an application according to the embodiment;

DETAILED DESCRIPTION

Figure 4:
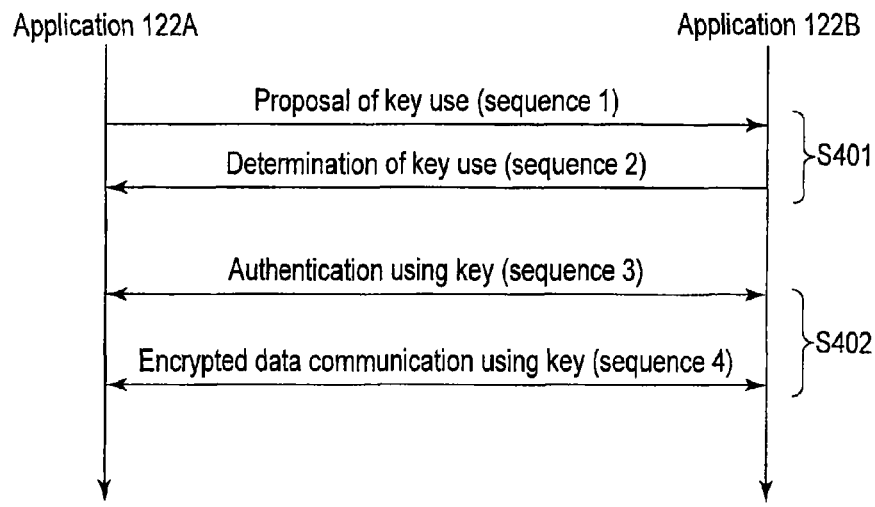
FIG. 4 is a sequence diagram illustrating a procedure for starting encrypted data communication according to the embodiment.

In general, according to one embodiment, a communication method including acquiring an application key from a key-sharing network, determining a key use of the application key, and performing encryption communication by using the application key according to the determined key use.

Various embodiments will be described hereinafter with reference to the accompanying drawings. In the embodiments, like reference numbers denote like elements, and a repetitive description thereof will be omitted.

FIG. 1 schematically illustrates an encryption communication system 100 according to an embodiment. As illustrated in FIG. 1, the encryption communication system 100 includes a key-sharing network 110 and an application network 120. The application network 120 is, for example, the Internet.

In the key-sharing network 110, a plurality of (five, in FIG. 1) nodes 112A to 112E are connected to each other through a plurality of inter-node links 114A to 114F. Each node performs encryption communication with correspondent nodes connected thereto through the inter-node links. For example, nodes 112A and 112B perform the encryption communication on the inter-node link 114A by using a given link key. Nodes 112B and 112C perform the encryption communication on the inter-node link 114C by using another link key. Nodes 112B and 112E perform the encryption communication on the inter-node link 114E by using a still another link key.

An application in the key-sharing network 110 uses an application key to perform the encryption communication with another application. For example, an application 122A uses the application key to perform the encryption communication with an application 122B over the application network 120. The application may be implemented integrally with the node or implemented as a device or a terminal separated from the node. A device provided with the application is referred to as an "application device". In the example of FIG. 1, the application is implemented as a terminal separated from the node.

A function of generating and sharing the link key between the nodes is realized by, for example, a technology called quantum cryptography or quantum key distribution (QKD). Further, a technology of generating and sharing the application key between the nodes may be realized by a technology described in Kollmitzer C., Pivk M. (Eds.), Applied Quantum Cryptography, Lect. Notes Phys. 797 (Springer, Berlin Heidelberg 2010), DOI: 10.1007/978-3-642-04831-9, and Dianati, M., Alleaume, R., Gagnaire, M. and Shen, X. (2008), Architecture and protocols of the future European quantum key distribution network, Security and Communication Networks, 1: 57-74. DOI: 10.1002/sec.13. For example, node 112A generates the application key which is a different random number from the link key, uses the link key to encrypt the application key, and transmits the encrypted application key to node 112B through the inter-node link 114A. Node 112B uses the link key to decrypt the encrypted application key. Then, node 112B uses the link key shared with node 112E connected thereto through the inter-node link 114E to encrypt the application key and transmits the encrypted application key to node 112E through the inter-node link 114E.

FIG. 2 schematically illustrates the node 112 according to the embodiment. The node 112 illustrated in FIG. 2 corresponds to each of nodes 112A to 112E illustrated in FIG. 1. The node 112 includes an inter-node communication unit 201, an application key generator 202, an application key storage/management unit 203, a state management unit 204, an application communication unit 205, a controller 206, and a node platform unit 207.

The inter-node communication unit 201 generates and shares a random number between itself and a correspondent node 250 connected thereto through an inter-node link 252 using a quantum cryptography communication technique. The generated random number is managed as the link key. The link key is used when one node performs inter-node data communication with another node connected thereto through the inter-node link. The inter-node data communication is encryption communication in which data is encrypted using the link key. The "another node" may be a correspondent node, such as the correspondent node 250, directly connected to the "one" node through the inter-node link or may be still another node connected to the "another node" through another inter-node link. In the latter case, the inter-node communication unit 201 may provide a routing function for allowing communication to be performed through the plurality of nodes in the key-sharing network 110. Data exchanged between the nodes by the inter-node communication unit 201 is, for example, data of the application key. Such data is transmitted after being encrypted by the link key managed by the node and decrypted on a receiving side.

The application key generator 202 generates the application key in a form of the random number. The application key may include a key ID. A format of the key ID of the application key may be any suitable format. For example, consecutive numbers are assigned to the key IDs of the application key for identification of their order. The generated application key is stored in the application key storage/management unit 203. The assignment of the key ID (association between the application key and key ID) may be performed by the application key storage/management unit 203 in place of the application key generator 202.

The application key storage/management unit 203 stores and manages the application key. The application key storage/management unit 203 can store the application key which is received from another node through the inter-node communication unit 201 as well as the application key generated by the application key generator 202.

The application key stored in the application key storage/management unit 203 is provided by the application communication unit 205 to an application 260 which is connected through an application communication link 262. The application key provided to the application 260 may be deleted from the application key storage/management unit 203. The application key to be stored in the application key storage/management unit 203 is one of the most important data in terms of security of the encryption communication system, so that it may be subjected to various security measures, such as encryption, anti-tampering, and access restriction, by a file system or operating system (OS). The application key storage/management unit 203 may be realized by various methods and, for example, it may be implemented by, for example, a file system or a database.

The application communication unit 205 communicates with the application 260 connected thereto through the application communication link 262. The application communication unit 205 receives a request from the application 260. The request includes an encryption communication start request (i.e., application key provision start request), an encryption communication end request (i.e., application key provision end request), an application key acquisition request, and the like. Individual encryption communication to be performed by the application 260 is referred to as a "session". A session identifier (session ID) is imparted to each session. Information of the session is managed by the state management unit 204. The information of the session represents what types of sessions exist, what type of application key is to be assigned, and the like.

Further, the application communication unit 205 provides data of the application key to the application 260. In the node 112, a unit of providing the data of the application key to the application 260 may differ from a unit of exchanging the application key with another node. Thus, the application communication unit 205 and application key storage/management unit 203 may manage to which extent the data of the application key assigned to the session has been provided.

The state management unit 204 manages various state information including information of the session, information of a rule and a state related to application key exchange, and the like. These information are referred to by or altered by the application communication unit 205.

The controller 206 controls the above-mentioned units for realizing the node function so as to achieve a series of application key sharing operation in the key-sharing network 110.

The node platform unit 207 provides management of elements on the node 112 other than those mentioned above, a computer operating system function that is needed for the node 112 to run, a basic network function, a security function, and the like.

It should be noted that the above-described configuration of the node according to the embodiment is just illustrative.

The following describes the application according to the embodiment with reference to FIG. 3.

FIG. 3 schematically illustrates an application 122 according to the embodiment. The application 122 illustrated in FIG. 3 corresponds to each of applications 122A and 122B, and application 260 illustrated in FIG. 2. The application 122 includes a node communication/key acquisition unit 301, an application execution unit 302, an authentication/encryption communication unit 303, a key use determination unit 304, and an application platform unit 305.

The node communication/key acquisition unit (also referred to simply as a "key acquisition unit") 301 communicates with a node 350 (specifically, the application communication unit of the node 350) connected thereto through a node communication link 352. The node communication/key acquisition unit 301 acquires, from the node 350, the application key required for the application 122 to perform the encryption communication. Data of the application key is provided from the node 350 as a key stream. The node communication/key acquisition unit 301 makes an application key acquisition start request before starting acquisition of the application key and makes an application key acquisition end request to end the application key acquisition. The key use of the application key determined by the above start and end commands is identified as the session. The node communication/key acquisition unit 301 stores and manages the acquired application key. The authentication/encryption communication unit 303 uses the application key stored in the node communication/key acquisition unit 301 to perform the encryption communication between the applications.

The application execution unit 302 executes an application function to be encryption-communicated. The application mentioned here may be any type as long as it is related to communication. For example, the application may be video transmission. For transmission/reception of data in the encryption communication, the authentication/encryption communication unit 303 is used.

The authentication/encryption communication unit (also referred to simply as an "encryption communication unit") 303 provides a communication function, an authentication function, and a communication data encryption/decryption function required for operation of the application execution unit 302. Upon reception of transmission data from the application execution unit 302, the authentication/encryption communication unit 303 encrypts the transmission data and transmits the encrypted transmission data to another application 360 through an encryption communication link 362. On the other hand, upon reception of data from the application 360 through the encryption communication link 362, the authentication/encryption communication unit 303 decrypts the data and passes the decrypted data to the application execution unit 302. In a case where a new application key is required for the encryption/decryption, the authentication/encryption communication unit 303 acquires the new application key from the node communication/key acquisition unit 301.

In the present embodiment, an authentication/encryption algorithm that the authentication/encryption communication unit 303 uses may be determined by the key use determination unit 304 or may be determined by another method (a static configuration, a negotiation used in Transport Layer Security [TLS] protocol, etc.). The authentication/encryption communication unit 303 can perform not only the encryption communication, but also authentication of a communication partner and data authentication. The authentication/encryption communication unit 303 of the present embodiment retrieves the application key from the node communication/key acquisition unit 301 and uses the retrieved application key to perform the authentication and encryption communication. At this time, the key use of the retrieved application key is determined and set by the key use determination unit 304. The authentication/encryption communication unit 303 cuts or splits the application key (specifically, the key stream of the application key) according to the key use determined by the key use determination unit 304 into smaller size pieces and uses the pieces of the application key to perform the encryption communication. In the encryption communication, the piece of the application key obtained by the cutting can be used as an authentication ID, an authentication password, a data authentication key, a data encryption key, etc., for encryption-communicating with an application (also called communication partner application) as a communication partner. Detailed description of the key use will be described later.

The key use determination unit 304 communicates and negotiates with the application 360 connected thereto through the encryption communication link 362 and determines the key use of the application key used in the encryption communication with the application 360. Further, the key use determination unit 304 can determine also an encryption algorithm to be used in the encryption communication.

The application platform unit 305 provides management of elements on the application 122 other than those mentioned above, a computer operating system function that is needed for the application 122 to run, a basic network function, a security function, and the like.

It should be noted that the above-described configuration of the application according to the embodiment is just illustrative.

FIG. 4 schematically illustrates a procedure for starting encrypted data communication according to the embodiment. In FIG. 4, there is assumed a scene where application 122A as a client starts communication with application 122B as a server. All the sequences illustrated here are performed over the application network 120 unless otherwise clearly specified.

In step S401 of FIG. 4, application 122A negotiates with application 122B as a communication partner to determine the key use of the application key. This negotiation is executed between the key use determination units 304 of applications 122A and 122B when each of the application execution units 302 of applications 122A and 122B executes the application function.

In application 122A, the node communication/key acquisition unit 301 acquires the application key from the node connected thereto through the node communication link according to an instruction from the application execution unit 302 (not clearly specified in FIG. 4). The acquisition of the application key may be executed along with the negotiation performed by the key use determination unit 304 or executed before or after the negotiation. Similarly, in application 122B, the node communication/key acquisition unit 301 may acquire the application key along with or before or after the negotiation performed by the key use determination unit 304 (not clearly specified in FIG. 4). However, the encrypted data communication using the application key cannot be performed between applications 122A and 122B until the key use determination unit 304 of application 122A or 122B determines the key use of the application key.

As a negotiation method for determining the key use of the application key between applications 122A and 122B, the following method is available, for example.

The key use determination unit 304 of application 122A stores information concerning the key uses available to application 122A, i.e., supported by application 122A, which are prioritized. For example, the information concerning the available key uses are stored in a form of a list. The key use determination unit 304 of application 122A selects one or more desired key uses from the key uses available to application 122A, creates a key use list of the selected key uses, and transmits the key use list to application 122B (sequence 1). The key use list can include the one or more key uses and information indicating the priority order (also referred to as the priority) of the key uses. Similarly, the key use determination unit 304 of application 122B also stores information concerning the key uses available to application 122B, which are prioritized. Upon reception of the key use list from application 122A, the key use determination unit 304 of application 122B selects, for example, a key use having the highest priority from the key uses that are included in the key use list and are available to application 122B. The key use determination unit 304 of application 122B notifies application 122A of the selected key use as a key use to be actually used (sequence 2).

A sequence concerning such a negotiation for determining the key use can be realized in various ways.

In one example, the negotiation is performed using a session control protocol such as Session Initiation Protocol (SIP). Specifically, the key use determination unit 304 of application 122A instructs the authentication/encryption communication unit 303 to transmit an SIP request message including the key use list to application 122B over the application network 120. Subsequently, the key use determination unit 304 of application 122B selects a key use to be actually used from the key use list received from application 122A and transmits an SIP response message including information indicating the selected key use to application 122A.

In another example, the key use determination unit 304 instructs the authentication/encryption communication unit 303 to perform the negotiation of an encryption algorithm in TLS or Secure Sockets Layer (SSL) and, at the same time, to perform the negotiation concerning the key use of the application key.

In still another example, the key use determination unit 304 of application 122A negotiates with the key use determination unit 304 of application 122B not over the application network 120, but over the key-sharing network 110. Specifically, the key use determination unit 304 of application 122A instructs the node communication/key acquisition unit 301 to notify the node of the key use list. In this case, the key use list reaches application 122B through one or more nodes included in the key-sharing network 110. The key use determination unit 304 of application 122B selects the key use to be actually used from the received key use list and notifies the node of the selected key use. Information indicating the key use selected by the key use determination unit 304 of application 122B reaches application 122A through one or more nodes included in the key-sharing network 110. In such a manner, the key use of the application key can be determined between applications 122A and 122B over the key-sharing network 110.

As described above, various formats of negotiations can be performed over the application network 120 or key-sharing network 110. In any of the above-described examples, what is transmitted from application 122A to application 122B is the key use list including one or more key uses that application 122A desires, and what is transmitted from application 122B to application 122A is the information indicating one key use that application 122B has selected from the key use list.

The following describes the key use of the application key.

The key use of the application key include information indicating a unit (for example, bit number) of cutting or splitting the key stream of the application key. For example, in a case where the application key is used for both encryption and authentication, the key use includes information indicating the bit number of a key used for the authentication and bit number of a key used for the encryption. Further, in a case where an ID (a key ID, user ID, or session ID) needs to be included in the encryption or authentication, the key use includes information indicating the bit number of a key used for the ID. Further, in a case where exchange of encrypted data and authentication processing are repeated at a constant rate, the key use includes information indicating the number of times of cutting the key used for the encryption before the key used for subsequent authentication is cut.

Further, in a broad sense, the key use of the application key may include configuration information indicating the encryption algorithm to be used. As the encryption algorithm, Advanced Encryption Standard (AES), Data Encryption Standard (DES), and the like may be used.

Figure 5:
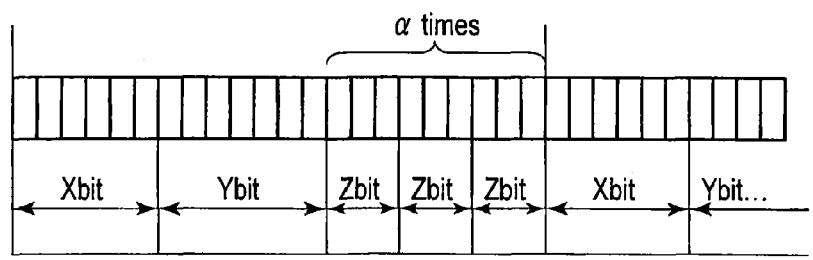
FIG. 5 is a view illustrating an example of a key use according to the embodiment.

FIG. 5 illustrates an example of the key use of the application key. More specifically, FIG. 5 illustrates an example of the key use of the application key in a case where an encryption algorithm of a TLS pre-shared key (TLS-PSK) system.

In the example of FIG. 5, the application cuts the key stream of the application key as follows:

1. The first X bits of the key stream are used an authentication ID (pre-shared key ID).
2. Y bits of the key stream after the authentication ID are used as an authentication key (pre-shared key).
3. Z bits of the key stream after the authentication key are used as an encryption/data authentication key.
4. Data exchange using the encryption/data authentication keys is executed a times.

The above steps 1 to 4 are repeated to use the application key.

In this case, the parameters X, Y, Z, and a are each the key use. That is, the key use includes parameters indicating a length of the key used for authentication, a length of the key used for encryption, a length of the ID, the number of times of exchange of encrypted data using authentication/encryption keys to be performed before subsequent authentication, and the like. The authentication/encryption communication unit 303 cuts the key stream according to the key use and interprets the pieces of the key stream as the authentication ID, authentication key, and encryption/data authentication key, respectively.

According to the embodiment, the negotiation is performed between the applications to determine the key use, thereby allowing the key use to be determined upon execution of the application, without statically determining the key use in advance. Further, providing a degree of freedom of the determination of the key use as described above allows the application to execute a variety of encryption schemes and allows the application to use (reuse) various implementations of existing encryption algorithm in communication in which the key stream provided from the key-sharing network is used as the key.

There can be considered a variety of methods that describe the key use of the application key as illustrated in FIG. 5 as data to be exchanged between the applications. For example, the following text description can be an example of the method that describes the key use and can be used in the above-described various formats of negotiations.

"[Auth] ID Length: X, Key length: Y, [Enc] Key length: Z, α times"

In step S402 of FIG. 4, in each of applications 122A and 122B, the key use determination unit 304 sets the determined key use in the authentication/encryption communication unit 303. Upon reception of transmission data from the application execution unit 302 of application 122A, the authentication/encryption communication unit 303 of application 122A retrieves the application key that the node communication/key acquisition unit 301 has acquired from the node, cuts the application key according to the key use set by the key use determination unit 304, and performs the authentication (sequence 3) and encrypted data communication (sequence 4) using the pieces of the application key.

The key use determination unit 304 may renegotiate, i.e., perform the negotiation once again during the encrypted data communication. For example, when a rate of the key stream of the application key that the node communication/key acquisition unit 301 acquires from the node, i.e., a throughput with which the application key is received from the key-sharing network is reduced, the key use determination unit 304 renegotiates to reduce a size of the key used for the encryption and/or reduce a frequency of performing the authentication. This allows the throughput of the encrypted data communication to be maintained. As a method for realizing such operations, a method that changes a type of the available (or supportable) key use when the throughput of the key stream of the application key varies, a method that changes the priority order when the throughput of the key stream of the application key varies, and the like can be employed. When a renegotiation is executed after the change of the type or priority order of the key use of the application key, a key use of the application key different from one before the execution of the renegotiation can be selected as a result of the negotiation.

As described above, according to the embodiment, determining, between the applications, the key use of the application key provided from the key-sharing network allows the encryption communication to be performed using the application key without statically determining the key use in advance.

The following describes modifications of the embodiment.

In the above embodiment, it is assumed that application 122A as a client starts the negotiation with respect to application 122B as a server. However, a method that determines the key use of the application key between applications 122A and 122B is not limited to this.

In a modification of the embodiment, application 122B as the server previously notifies application 122A as the client of information concerning the key use of the application key available thereto in some way. Application 122A refers to the information notified from application 122B and selects, as "key use of the application key to be actually used", a key use having the highest priority from key uses of the application key that are available to both applications 122A and 122B. In this case, in sequence 1 of FIG. 4, application 122A transmits information indicating the selected key use to application 122B in place of the key use list. Alternatively, application 122A may select a plurality of key uses in descending order of the priority from key uses of the application key that are available to both applications 122A and 122B by referring to the information notified from application 122B. In this case, in sequence 1, application 122A transmits the key use list including the plurality of selected key uses to application 122B. Then, in sequence 2, application 122B selects one key use from the received key use list and transmits information indicating the selected key use to application 122A. Such methods are included in the negotiation in a broad sense.

In order for application 122B as the server to previously notify application 122A as the client of the information concerning the key use of the application key available thereto, a directory service for collecting and sharing of address information of the applications connected to the nodes build on the key-sharing network can be used, for example. In this case, application 122B notifies the node of the information concerning the key use of the application key available thereto and information concerning the encryption algorithm available thereto. The node receives these information and stores them in the directory service. Application 122A issues an inquiry to the node and, correspondingly, the node returns a result of an inquiry for the directory service, thereby allowing acquisition of these information (information concerning the key use of the application key available to application 122B and information concerning the encryption algorithm available to application 122B).

Further, in the case where the renegotiation is executed during the encrypted data communication to change or redetermine the key use of the application key, the application that starts the renegotiation may be the client or server, i.e., application 122A or application 122B.

At least part of processing in the above embodiments can be realized by using a general-purpose computer as basic hardware. A program realizing the above processing may be provided by being stored in a computer-readable storage medium. The program is stored in the storage medium as a file of an installable format or an executable format. The storage medium includes a magnetic disk, an optical disk (CD-ROM, CD-R, DVD, etc.) a magneto optical disk (MO, etc.), and a semiconductor memory. The storage medium may be any type as long as it can store the program and is computer readable. Further, the program realizing the above processing may be stored in a computer (server) connected to a network such as Internet and downloaded to a computer (client) over a network.

According to at least one of the embodiments described above, there are provided a communication method, an application device, a program, and a communication system which use the application key provided from the key-sharing network to perform the encryption communication.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication method, comprising:
    acquiring an application key from a connected first key sharing unit on a key-sharing network;
    determining a key use of the application key by negotiating with a corresponding application device connected with a second key sharing unit on the key-sharing network, wherein the negotiating comprises sending a message which links at least one supported key use of the application key to the priority information and receiving a response message including one of the at least one supported key use of the application key; and
    performing encryption communication at least by sending encrypted data encrypted with an encryption key which is obtained from a part of the application key and by performing identification of an application device operating according to the communication method with an authentication ID which is obtained from another part of the application key, according to the determined key use.

2. The method according to claim 1, wherein the key use includes information indicating length of the authentication ID and length of the encryption key.

3. The method according to claim 1, wherein the negotiating comprises negotiating with the corresponding application device over the key-sharing network.

4. The method according to claim 1, wherein the negotiating comprises negotiating with the corresponding application device over a network different from the key-sharing network.

5. The method according to claim 1, further comprising renegotiating with the corresponding application device when a throughput with which the application key is received from the key-sharing network varies.

6. The method according to claim 1, wherein the key use includes information indicating a unit of cutting the application key.

7. The method according to claim 6, wherein the encryption communication uses a piece of the application key obtained by the cutting as an authentication ID, an authentication password, a data authentication key, or a data encryption key for use in an encryption communication with the corresponding application device.

8. The method according to claim 2, wherein the key use further includes information indicating a number of the use of the authentication ID.

9. An application device, comprising:
    a key acquisition unit configured to acquire an application key from a connected first key sharing unit on a key-sharing network;
    a determination unit configured to determine a key use of the application key by negotiating with a corresponding application device connected with a second key sharing unit on the key-sharing network, wherein the negotiating comprises sending a message which links at least one supported key use of the application key to the priority information and receiving a response message including one of the at least one supported key use of the application key; and
    an encryption communication unit configured to perform encryption communication at least by sending encrypted data encrypted with an encryption key which is obtained from a part of the application key and by performing identification of the application device with an authentication ID which is obtained from another part of the application key, according to the determined key use.

10. The device according to claim 9, wherein the key use includes information indicating length of the authentication ID and length of the encryption key.

11. The device according to claim 9, wherein the determination unit negotiates with the corresponding application device over the key-sharing network.

12. The device according to claim 9, wherein the determination unit negotiates with the corresponding application device over a network different from the key-sharing network.

13. The device according to claim 9, wherein the determination unit renegotiates with the corresponding application device when a throughput with which the application key is received from the key-sharing network varies.

14. The device according to claim 9, wherein the key use includes information indicating a unit of cutting the application key.

15. The device according to claim 14, wherein the encryption communication uses a piece of the application key obtained by the cutting as an authentication ID, an authentication password, a data authentication key, or a data encryption key for use in an encryption communication with the communication partner application device.

16. The method according to claim 10, wherein the key use further includes information indicating a number of the use of authentication ID.

17. A communication system performing encryption communication by using an application key between a first application device connected with a first key sharing unit on a key-sharing network and a second application device connected with a second key sharing unit on the key-sharing network, the first application device comprising:

a key acquisition unit configured to acquire an application key from a connected first key sharing unit on a key-sharing network;

a determination unit configured to determine a key use of the application key by negotiating with a second application device, wherein the negotiating comprises sending a message which links at least one supported key use of the application key to the priority information and receiving a response message including one of the at least one supported key use of the application key; and an encryption communication unit configured to perform encryption communication with the second application device at least by sending encrypted data encrypted with an encryption key which is obtained from a part of the application key and by performing identification of the first application device with an authentication ID which is obtained from another part of the application key, according to the determined key use.

* * * * *